United States Patent
Axford et al.

(10) Patent No.: US 8,086,883 B2
(45) Date of Patent: Dec. 27, 2011

(54) HARDWARE DRIVEN PROCESSOR STATE STORAGE PRIOR TO ENTERING A LOW POWER

(75) Inventors: Simon Axford, Cambridge (GB); Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 508 days.

(21) Appl. No.: 12/289,850

(22) Filed: Nov. 5, 2008

(65) Prior Publication Data

US 2009/0164814 A1  Jun. 25, 2009

(30) Foreign Application Priority Data

Dec. 19, 2007 (GB) .................................. 0724765.3

(51) Int. Cl.
*G06F 1/32* (2006.01)
(52) U.S. Cl. .................... 713/320; 713/323; 713/324
(58) Field of Classification Search ................. 713/320, 713/323, 324
See application file for complete search history.

(56) References Cited

U.S. PATENT DOCUMENTS

| | | | |
|---|---|---|---|
| 5,784,628 A | 7/1998 | Reneris | |
| 6,968,469 B1 | 11/2005 | Fleischmann et al. | |
| 7,624,215 B2 * | 11/2009 | Axford et al. | 710/260 |
| 7,895,458 B2 * | 2/2011 | Kim | 713/330 |
| 2003/0101362 A1 | 5/2003 | Dia | |

FOREIGN PATENT DOCUMENTS

GB  2 395 302  5/2004

OTHER PUBLICATIONS

UK Search Report for GB Application No. 0724765.3, dated Apr. 11, 2008, (3 pages).
U.S. Appl. No. 12/010,401, Axford et al., filed Jan. 24, 2008.

* cited by examiner

*Primary Examiner* — Glenn A Auve
(74) *Attorney, Agent, or Firm* — Nixon & Vanderhye P.C.

(57) ABSTRACT

A data processing apparatus includes a processor for processing data and having memory interface logic for controlling transfer of data to a memory. Also included is a memory for storing data processed by said processor. The processor is powered in a first domain and the memory is powered in a second domain. A system bus is coupled to the processor and the memory to transfer data therebetween in response to memory transfer requests. The processor is responsive to a low power request to enter a low power mode to control transfer of state data indicating a current state of the processor to the memory via the system bus using memory interface logic. The state data is sufficient to restore the processor to an equivalent program state following exit from the low power mode, store the state data in memory; and power down the first domain.

17 Claims, 6 Drawing Sheets

HARDWARE DRIVEN PROCESSOR STATE STORAGE PRIOR TO ENTERING A LOW POWER

BACKGROUND OF THE INVENTION

1. Field of the Invention

The present invention relates to the field of data processing and in particular to the storing of a state of a processor prior to entering a low power mode in which the processor is powered down.

2. Description of the Prior Art

It is known to turn a clock off to a processor for periods when no work is required from it. This reduces power consumption, however there are still power losses due to leakage through the silicon. These power losses could be reduced by turning the power off to the core, but this has the drawback that state in the processor may be lost. It is important that when the low power mode is exited, the system should return to its previous state unaltered such that processing operations can continue smoothly and efficiently. It would be highly disadvantageous if information/state was lost during low power mode so as to require a full system reboot and initialisation upon restart. It is known to provide data processing systems in which the system state may be saved and restored.

In order to facilitate this type of power saving during low power mode, it is known to provide power down software routines on data processing systems which are executed when entry to the low power or power down mode is required and which serve to save to some non-volatile storage the state of the system such that a complementary piece of software can be run when the system resumes operation and this state information can be restored from the non-volatile storage. Processing can then be recommenced at the same point and with the same system state. A significant disadvantage with this approach is that the software required to execute the store and restore of state is relatively slow. Furthermore, there may be some system state information which is not accessible to the software responsible for saving the system state, such as for example cache memory contents, tightly coupled memory contents and other relatively low level hardware state information concerning the system. In such circumstances, when processing is resumed, it recommences in a way that only approximates the state of the system when power down occurred. Thus, there may be a requirement to refill all of the cache memories which may be a relatively slow and power consuming operation. Furthermore, on restarting the system some state, such as page table mappings, which is required for a simple restart is not available.

An alternative hardware state saving system is disclosed in patent application GB02395302 to ARM® Cambridge Limited. In this system, scan chains present in the processor are used to extract the state of the processor and this state is then stored to memory. The state can then be restored by using the scan chains to scan the state back in. A disadvantage of this system is that the scan chains scan in and out the entire state of the core and the entire state may not be needed to restore the system following low power mode. Furthermore, use of scan chains in this way needs to be done at implementation time where they will need to be hooked up correctly as well as balanced and controlled appropriately.

It would be advantageous to produce a system of storing and restoring state of a processor without at least some of the disadvantages of the prior art.

SUMMARY OF THE INVENTION

A first aspect of the present invention provides a data processing apparatus comprising: a processor for processing data, said processor comprising memory interface logic for controlling transfer of data to a memory, said processor being powered in a first power domain; a memory for storing data processed by said processor, said memory being powered in a second power domain; a system bus coupled to said processor and said memory and operable to transfer data between said processor and said memory in response to memory transfer requests issued upon said system bus by said memory interface logic during normal processing operation of said processor and said memory; wherein said processor is responsive to a low power request indicating said data processing apparatus should enter a low power mode to: control transfer of state data indicating a current state of said processor to said memory via said system bus using said memory interface logic, said state data being sufficient data to restore said processor to an equivalent program state following exit from said low power mode; store said state data in said memory; and power down said first power domain.

The present invention provides for the state of the processor to be automatically stored by hardware in response to a low power request thereby allowing the processor to be completely powered down in low power mode. The present invention makes use of existing hardware used to store data to memory during normal processing operations to perform this storage. This is efficient on processor area and also means that the hardware does not need to be specially designed for this state storage task at the implementation level. Furthermore, as the storage is under control of the processor, the state that is stored can be determined by the processor and can be limited to that that is required to restart the processor. Thus, an efficient selection of the relevant state can be made rather than storing the entire state of the processor. This along with the fact that storage is done using hardware improves the speed of the process.

In some embodiments, said data processing apparatus further comprises a controller for controlling powering up and down of said first power domain; said controller being powered by said second power domain and comprising a data store for storing a state restore indicator; wherein in response to detection of said low power request said controller stores a state restore indicator value indicating that said processor is powered down in response to said low power request; said controller is responsive to an input signal indicating said processor should power up to power said first power domain up and to send a signal to said processor indicating if said power up is a standard reset or a state restore reset in dependence upon said state restore indicator value; and in response to said controller indicating said power up is in response to said state restore reset said processor loads said stored state data from said memory.

Embodiments of the present invention can distinguish between standard reset signals and state restore reset signals by storing state reset indicator values in the power controller when state has been stored to memory before powering down. Thus, a power controller can power up the processor in response to a standard reset or can power it up and then signal to the processor to load state in response to a state restore reset enabling it to continue processing from the point at which it was powered down. Thus, embodiments of the present invention are able to process two different sorts of reset using hardware much of which is present in a conventional data processing apparatus.

In some embodiments, said processor is configured to store said state data on a stack within said memory in response to said low power request, said processor comprising stack/unstack logic for stacking said state data to said stack in response to said low power request and for unstacking said state from said stack in response to a subsequent power up signal.

Although the data can be stored in the memory in any configuration it may be advantageous to store it on a stack within the memory and to use stack/unstack logic for stacking the state data and for unstacking it. Stacks are convenient ways to store a string of data to and from a memory.

In some embodiments, said state restore indicator value comprises an address of a top of said stack.

Although the state restore indicator can take a number of forms, if the state data is to be stored on a stack then a convenient form of the state restore indicator value is an address indicating the top of the stack. This enables the information that it is a state restore reset to be sent to the processor along with the information of where to retrieve the state data from.

In some embodiments, said data processing apparatus further comprises an interrupt controller said processor being configured to store some state data of said processor onto at least a portion of said stack in said memory in response to receipt of an interrupt and to restore said some state in response to said interrupt completing.

The data processing apparatus may comprise an interrupt controller and it is convenient if the stack/unstack logic that is used to store the state on reset is the same stack/unstack logic used to store state in response to an interrupt. Re-using this hardware in this way is an efficient way of implementing the data processing apparatus. The state required to be stored following in interrupt is only a subset of the state of the processor and is not sufficient state to restore it if it were powered down. Thus, generally only a portion of the stack used for storing the reset state of the processor is used for storing state after an interrupt. Furthermore, the stack/unstack logic only needs to access a portion of the state. Thus, the stack/unstack logic used for storing the state data of the processor on entry to low power mode is in effect an extended form of the stack/unstack logic that would be used to store state following an interrupt. It should be noted that by interrupt we mean any "wake up event", thus as well as conventional interrupts, the interrupt controller is also responsive to resets or other system events such as those required for multiprocessor systems.

The low power request signal may take a number of forms in some embodiments it comprises a wait for interrupt signal that is issued by the processor when it has no instructions to process for a while.

In some embodiments, said interrupt controller comprises a plurality of interrupt inputs for receiving a plurality of interrupts at least one of said plurality of interrupt inputs comprising a power up signal.

A power up signal may be received by the processor in a number of forms, but in some embodiments it is received as an interrupt at the interrupt controller.

In some embodiments, said interrupt controller comprises: interrupt control circuitry powered in said first power domain; and interrupt request monitoring circuitry powered in a second power domain; said interrupt request monitoring circuitry being adapted to monitor for said power up signal during operation in said low power mode.

The interrupt controller can take a number of forms but in some embodiments it is formed in two parts, a first part being powered in the first power domain and the second part in the second power domain. Splitting the interrupt controller in this way allows for increased power savings when entering low power mode. It is only possible to split it in this way if the interrupt request monitoring circuit that monitors the power signals is in the second power domain.

In some embodiments, said interrupt control circuitry comprises interrupt inputs for receiving said interrupt requests and is configured selectively to provide a received interrupt request to said processor; said interrupt control circuitry is arranged to communicate interrupt select information to said interrupt request monitoring circuitry, said interrupt select information identifying interrupt requests which indicate exit from said low power mode; said interrupt request monitoring circuitry comprises a select information store configured to store said select information communicated to the interrupt request monitoring circuitry by said interrupt control circuitry; and said interrupt request monitoring circuitry comprises interrupt inputs for receiving said interrupt requests, and is responsive to a received interrupt request identified by said stored interrupt select information to trigger power up of said first power domain.

In order to enable the interrupt monitoring circuitry to identify power up signals information is sent from the interrupt control circuitry prior to it being powered down. This information identifies which interrupts should trigger power ups. Sending information like this enables the complex part of the interrupt controller, that assesses the priority of the interrupts to be powered down in low power mode after it has sent the relevant priority information concerning interrupts to be received to the monitoring logic, this enables the monitoring logic to be simple logic and thus, not consume much power but still be able to identify interrupts that need to be serviced and in response to any received to enable power up.

In some embodiments, said processor comprises a pipeline processor, and in response to said low power request said data processing apparatus is configured to suspend loading of any further instructions into said pipeline processor and to complete processing of pending instructions within said pipeline processor prior to storing said state data to said memory and powering down said first power domain.

It may be advantageous in response to the low power request to complete processing of pending instructions prior to powering down the processor. Handling low power requests in this manner enables the state that needs to be sent to be stored in the memory to be reduced compared to the state that would need to be sent if some instructions were still pending in the pipeline.

In some embodiments, said data processing apparatus is configured to select state data to store to said memory in dependence upon current operating conditions of said data processing apparatus.

The amount of state sent to the memory may be dependent on an operating condition of the processor. Thus, in some embodiments the processor can select the amount of state data to be sent in dependence upon the operating conditions. This enables the amount of state data that is sent to be reduced to that which is required in dependence upon the operating condition of the processor at the time of low power mode entry.

For example, in some embodiments said data processing apparatus is responsive to: said memory protection unit being operational, to store said memory protection data as part of said state data to said memory; and to said memory protection unit being switched off, to not store memory protection data as part of said state data to said memory.

In some operating conditions the memory protection unit is not operational. If the processor detects this then it knows that the memory protection information does not need to be sent to the memory for storage at this point as the memory protection unit will not need to be restored on reset as it was not operational when entering low power mode.

The state data stored needs to be sufficient to enable the processor to recommence processing following exit from the low power mode. Thus, it comprises data such as the program counter, the stack pointer and at least a subset of the registers within the processor.

A further aspect of the present invention provides a method of saving state prior to entering a low power mode within an apparatus for data processing, said apparatus for processing data having: a processor for processing data, said processor comprising memory interface logic for controlling transfer of data to a memory, said processor being powered in a first power domain; a memory for storing data processed by said processor said memory being powered in a second power domain; a system bus coupled to said processor and said memory and operable to transfer data between said processor and said memory in response to memory transfer requests issued upon said system bus by said memory interface logic during normal processing operation of said processor and said memory; said method comprising the steps of: in response to a low power request indicating said data processing apparatus should enter a low power mode: transferring state data indicating a current state of said processor within said data processing apparatus to said memory via said system bus using said memory interface logic; storing said state data in said memory; and powering down said first power domain.

The above and other objects, features and advantages of this invention will be apparent from the following detailed description of illustrative embodiments which is to be read in connection with the accompanying drawings.

DESCRIPTION OF THE PREFERRED EMBODIMENTS

Figure 1:
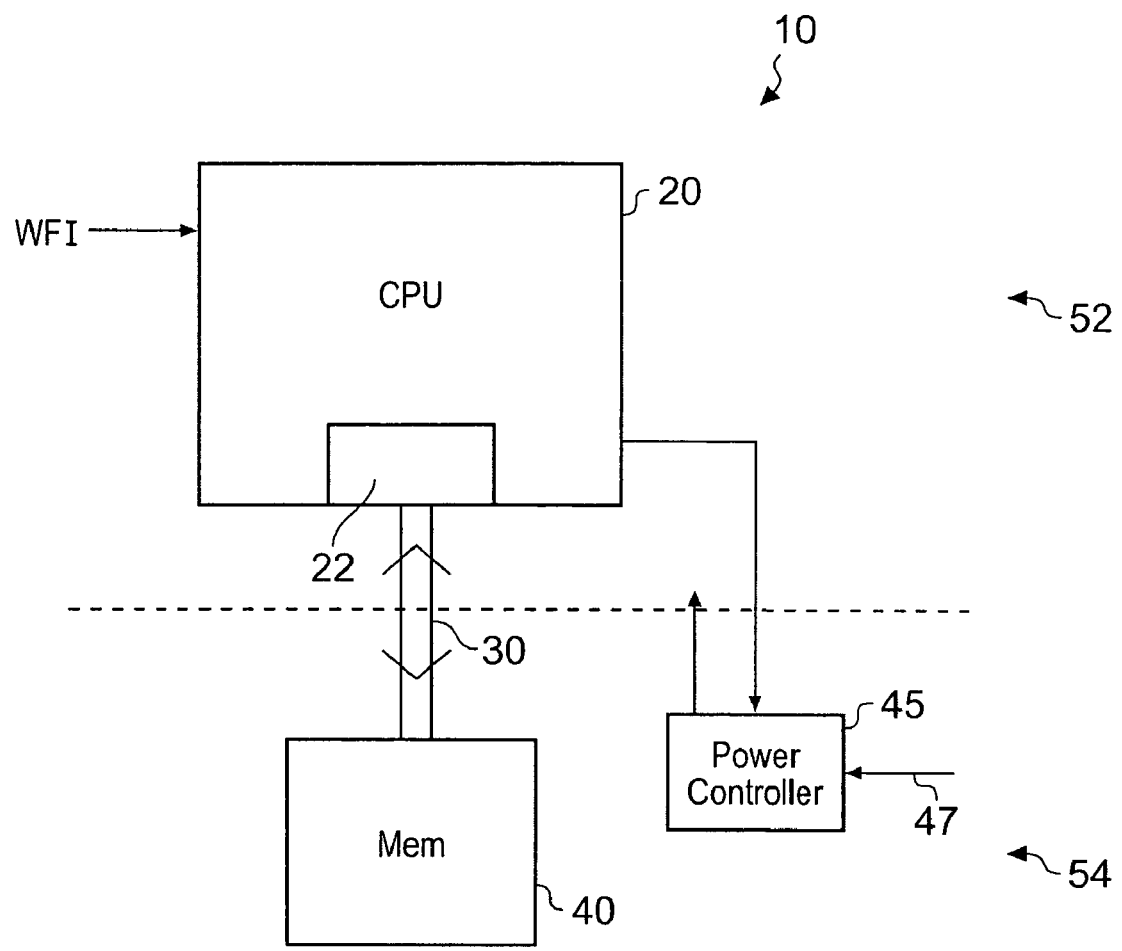
FIG. 1 shows in schematic block form a data processing apparatus according to an embodiment of the present invention.

FIG. 1 shows a data processing apparatus 10 having a processor 20 with a memory interface 22 connected via a system bus 30 to a memory 40. The CPU processor is in a first power domain 52 while the memory 40 and a power controller 45 are in a second power domain 54.

Data processor 20 processes data according to instructions received and stores some of this processed data in memory 40. The storage and retrieval of data to memory 40 is controlled by memory interface logic 22. Thus, during normal data processing operations processor 20 processes data at least some of which it sends and/or receives from memory 40 via system bus 30 using memory interface logic 22.

The processor 20 is in a first power domain 52 the powering of which is controlled by power controller 45. The memory 40 and power controller 45 are in a second power domain 54. In order to save power when the processor 20 is not operational the power controller 45 is adapted to stop the clock to the processor 20 or power down the first power domain in response to signals indicating that a low power mode is to be entered. If the low power mode to be entered is one where the first power domain is to be switched off, then prior to doing this the state of processor 20 needs to be stored so that the processor can be re-started. A signal requesting entry to low power mode may for example be a wait for interrupt WFI signal. In response to this being received at processor 20, processor 20 acts to store the architectural state of the processor to memory 40 using the standard hardware used to store data to the memory during normal processing, in other words memory interface logic 22 and system bus 30. Once the state has been stored to the memory then a signal is sent to power controller 45 and the first power domain 52 is powered down.

Power controller 45 then monitors the power request line 47 for a power up signal and in response to such a signal it acts to power up the first power domain 52. This power up signal may be generated in response to an interrupt and this is described in detail later.

In response to first power domain 52 being powered up CPU 20 retrieves the state that it stored to memory 40 using memory interface logic 22. It is then ready to continue processing from the point at which it stopped when the low power mode was entered.

Figure 2:
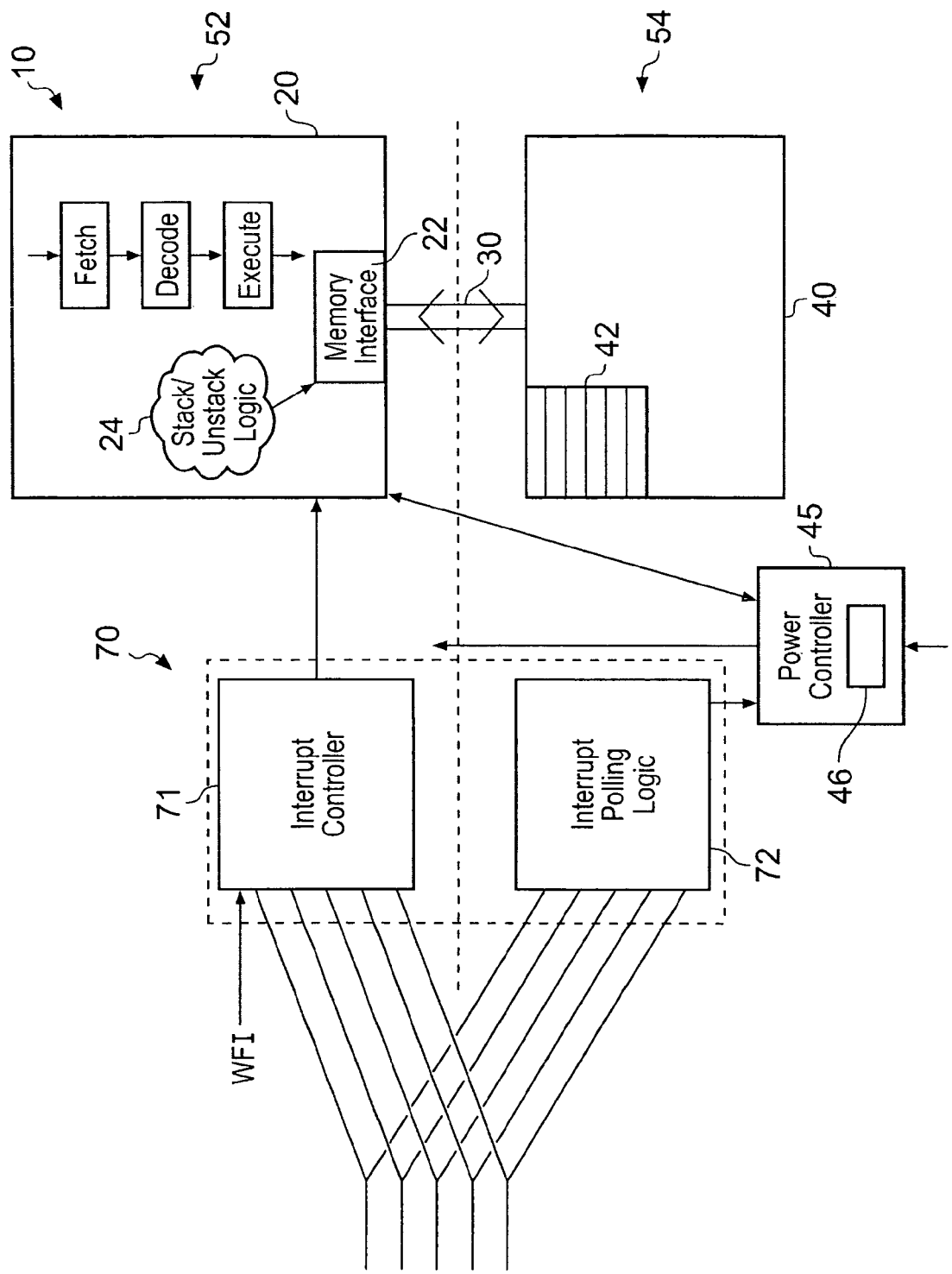
FIG. 2 shows a further embodiment of a data processing apparatus according to an embodiment of the present invention.

FIG. 2 shows data processing apparatus 10 according to a further embodiment of the present invention. In this embodiment processor 20 is a pipeline processor with fetch, decode and execute stages. The data processing apparatus 10 also comprises an interrupt controller 70 having an interrupt controller portion 71 in the first power domain 52 and interrupt polling logic 72 powered in the second power domain 54. Interrupts are input to both the interrupt controller portion 71 and the interrupt polling logic portion 72 of the controller 70. The interrupt controller 70 processes the interrupts and sends signals to processor 20 as appropriate. In response to a signal such as a wait for interrupt signal received at interrupt controller 70 indicating a low power mode is to be entered, interrupt controller 70 sends a low power request signal to processor 20. In response to this signal processor 20 suspends fetching of instructions by the fetch stage of the pipeline and continues to process any pending instructions within the pipeline. When the pipeline has finished processing any pending instructions then the architectural state of the processor, that is the state that is sufficient to restore the processor to a point where it can continue executing from the next instruction, is stored in memory 40. In this embodiment, stack/unstack logic 24 is used in conjunction with memory interface 22 to store the architectural state onto a stack 42 within memory 40. The state stored includes the program counter, stack pointers and values from the register bank. It may also include memory protection details, enable bits, interrupt priorities and pending or active bits. Once the state has been loaded onto stack 42 a signal is sent from processor 20 to power controller 45 indicating that the state has been stored to memory 40 and it can be powered down. Power controller 45 then powers down first domain 52 and stores in data store 46 an indicator indicating that low power mode has been entered in such a way that state was stored to memory 40.

Once the first domain 52 is powered down then interrupt controller portion 71 and processor 20 are no longer powered. However, the second power domain 54 is still powered and thus, interrupt polling logic 72 actively polls interrupts to detect a power up signal. In this respect interrupt polling logic may receive all interrupts or it may just receive a subset of them. The subset would include all interrupts that might generate power up of the processor. Furthermore, information regarding which interrupts should generate a power up signal was received from the interrupt controller portion 71 prior to power down and was stored in the interrupt polling logic such that the polling logic can determine when to issue a power up signal from the stored data.

In response to detecting an interrupt that matches one of the stored interrupts the interrupt polling logic 72 issues a power up signal to power controller 45 which powers up the first domain 52. At this point power controller 45 looks to see if it has a value stored in data store 46. If a value is stored then it sends a signal to processor 20 indicating that the state needs to be restored. Stack/unstack logic 24 along with the memory interface 22 then unstacks stack 42 and loads the former state of processor 20 back into the processor. The processor is then ready to restart processing from the subsequent instruction to that received before low power mode was entered.

It should be noted that as all pending instructions within the pipeline were executed prior to storing the state, less state needed to be stored than would have been the case if that had not occurred. If there had been some pending partially executed instructions within the pipeline the contents of things like the fetch buffer and decode information would also have needed to have been stored and restored.

Stack/unstack logic 24 is also used in the processing of interrupts, with the relevant state being stored out to stack 42 in response to an interrupt. Generally, this is less state than that required to restart the processor and thus, conventional stacking/unstacking logic and stack have been extended in embodiments of the present invention to be able to store and restore architectural state of a processor prior to powering down.

In this respect it should be noted that peripherals may be powered down in low power mode too, although this is not shown in the figures. In such circumstances the architectural state of the peripherals is also stored to memory so that this state can also be restored following power up. The stack/unstack logic is arranged to have access to this state too, so that it can perform the store and restore of the state.

It should be noted that the power down process can itself be interrupted if a high priority interrupt is received during power down. In such a situation the storage of state is suspended and the stack is unstacked from the point it had reached and then, the appropriate state for servicing the interrupt is stored to the stack prior to the interrupt being serviced.

Figure 3:
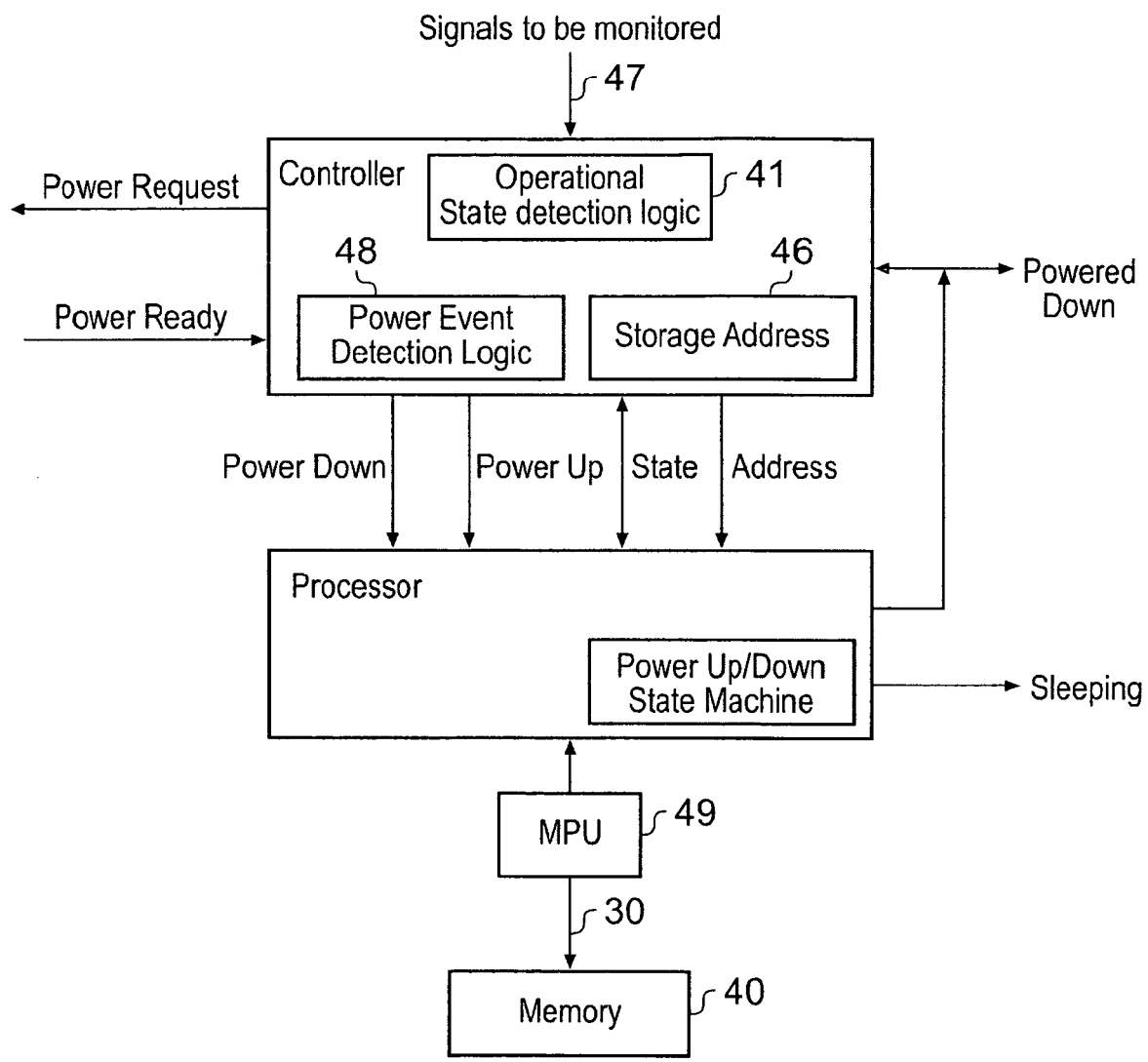
FIG. 3 shows an integrated circuit the power controller, processor and memory of a system according to an embodiment of the present invention.

FIG. 3 shows power controller 45, processor 20 and memory 40 according to another embodiment. As can be seen the power controller 45 interfaces with processor 20 directly. When the controller detects a power event using power event detection logic 48 indicating low power mode is to be entered it sends a power down signal to processor 20. To enter this power down state the processor first stores all of its essential state to a stack starting at the storage address 46 given to it by the power controller 45. When determining what state to store the power controller 45 uses operation state detection logic 49 that detects the operational state of the processor and thus, detects what state needs to be stored. For example, if the memory protection unit 49 is operational information regarding the security status of the memory needs to be stored whereas if it is not operational then this does not need to be stored. Once this storage process is complete the processor signals to the system which can then turn off the power to the processor 20. The power controller 45 continues to be powered and monitors certain signals 47 to determine if power up is required. If it detects such a power up event then the controller 45 signals this to the system which turns the power to processor 20 back on. When the power is reapplied the processor 20 is in a reset state and the controller asserts the signals stating that this is not a standard reset but instead a state restore power up event. The processor 20 then retrieves all of its essential state from memory 40. This includes the program counter and stack pointer for example. The processor 20 can then start executing from where it stopped prior to entering the low power mode.

Figure 4:
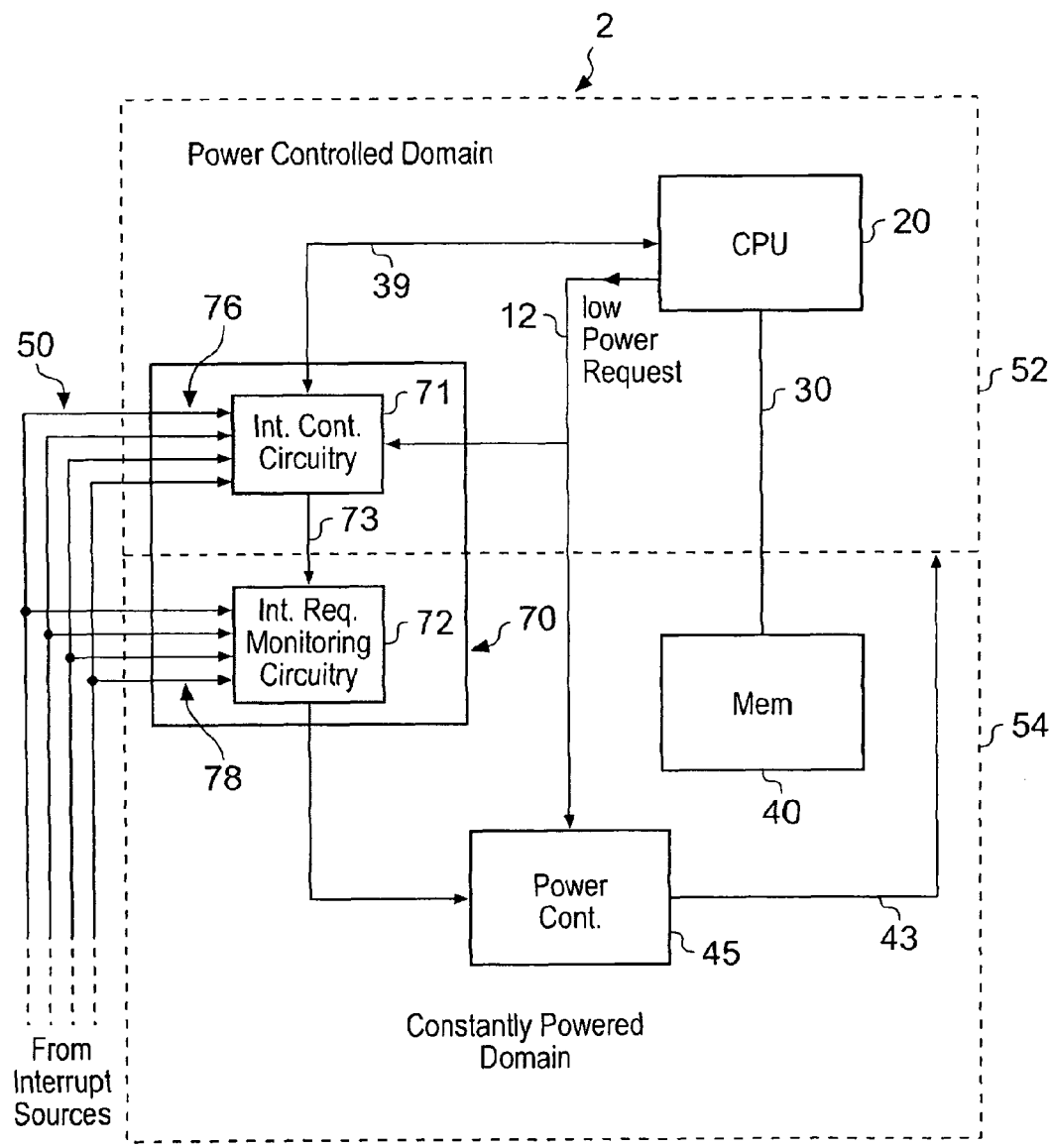
FIG. 4 shows an integrated circuit according to an embodiment of the present invention.

FIG. 4, schematically illustrates an integrated circuit 2 which is divided into two power domains. In particular, a power controlled domain 52 is provided which can be powered down in order to save power in a low power mode, and a "constantly" powered domain 54, which is not powered down in the low power mode, is provided. By dividing up the integrated circuit in this way, components of the integrated circuit which can safely be powered down when not required can be provided within the power controlled domain 52, while components which must be constantly powered during operational mode in order to ensure correct functioning of the integrated circuit can be provided in the constantly powered domain 54.

In the power controlled domain 52, there is provided a central processing unit 20 for processing instructions and data. The central processing unit 20 can be powered down when no instructions and/or data are pending for processing without losing data or impeding function. Alternatively, the central processing unit 20 can be powered down when instructions and/or data are being processed without losing a current processing task by storing a copy of the current state of the system to a memory before powering down the power controlled domain 52. Accordingly, the central processing unit 20 can readily be provided within the power controlled domain 52.

In the constantly powered domain 54, there is provided a memory 40, coupled to the central processing unit 20 via an address and data bus 30, which stores data generated by, or for use by, the central processing unit 20. It will be appreciated that the memory 40 is present in the constantly powered domain 54 in order that the contents of the memory 40 can preserved when the low powered mode is entered. This is particularly important where a current operating state of the system, and in particular of the central processing unit 20, is stored into the memory 40 before the power controlled domain switches into the low power mode to enable resumption of process by the central processing unit 20 at a later time.

The constantly powered domain 54 also includes a power controller 45 which is configured to power down the power controlled domain in response to a low power request signal issued to the power controller 45 from the central processing unit 20 on a low power request signal line 12. The power controller 45 is configured to apply power to the power controlled domain via a power line 43.

The integrated circuit 2 also includes an interrupt controller 70 which handles interrupt requests issued by a plurality of interrupt sources for servicing by the central processing unit 20. The interrupt sources may include components of the integrated circuit, external off-chip sources, or software generated interrupts. In contrast to the other components of the integrated circuit, the interrupt controller 70 is not provided solely within one power domain, but is instead distributed across both the power controlled domain 52 and the constantly powered domain 54. More specifically, a first portion 71 of the interrupt controller 70 is provided within the power controlled domain 52, while a second portion 72 of the interrupt controller 70 is provided within the constantly powered domain 54. In this way, functional components of the interrupt controller 30 which can be powered down when not in use without compromising the operation of the interrupt controller 70 can be provided within the first portion 71, that is, within the power control domain 52, while the remaining functional components of the interrupt controller 70, which cannot be powered down without compromising the operation of the interrupt controller 70, are provided within the second portion 72, that is, within the constantly powered domain 54.

More particularly, the first portion 71 of the interrupt controller 70, provided within the power controlled domain 52, comprises interrupt control circuitry which has interrupt inputs for receiving interrupt request signals 50 from the interrupt sources, and which determines which, if any, of these interrupt request signals 50 should be passed to the central processing unit 20 over an interrupt request interface 39. The interrupt control circuitry includes prioritisation logic for assigning priorities to particular interrupt request signals and the decision making logic capable of selecting interrupt requests for communication to the central processing unit 20 on the basis of currently applied interrupt request signals, the respective priorities assigned to the interrupt request signals by the prioritisation logic, and current operating conditions of the central processing unit 20. The interrupt control circuitry is configured to provide the selected interrupt request signals to the central processing unit 20 via the interrupt request interface 39. It will be understood that the interrupt control circuitry will be powered down when the first domain is switched into the low power mode.

Certain interrupt requests relate to processing tasks which are sufficiently important that the central processing unit 20 and the interrupt control circuitry 71 should be powered up out of the low power mode in order to service the interrupt request. The determination and selection of which interrupt requests should cause the low power mode to be exited is made by the interrupt control circuitry 7 in response to the low power request signal issued by the central processing unit 20 on the low power request signal line 12. The selected interrupt requests 50 are then communicated from the interrupt control circuitry 71 to the second portion 72 of the interrupt controller 70 via an interrupt request identifying signal line 73 prior to the power controlled domain 52 being powered down. In this way, the second portion 72 of the interrupt controller 70 is provided with select information identifying interrupt requests which should cause the low power mode to be exited before the first portion 71 of the interrupt controller 70 is powered down.

The second portion 72 of the interrupt controller 70, provided within the constantly powered domain 54, comprises interrupt request monitoring circuitry which has interrupt inputs for receiving interrupt request signals, and which monitors the received interrupt request signals issued by the interrupt sources on the interrupt request signal lines 50. The interrupt request monitoring circuitry compares each received interrupt request with the select information communicated to the second portion 72 of the interrupt controller 70 by the interrupt control circuitry. In the case of a match, the interrupt request monitoring circuitry is configured to issue a power up request signal to the power controller 45 on a power up request signal line. In response, the power controller 45 is configured to power up the power control domain thereby activating both the central processing unit 20 and the interrupt control circuitry 72 to enable the interrupt request to be serviced.

Figure 5:
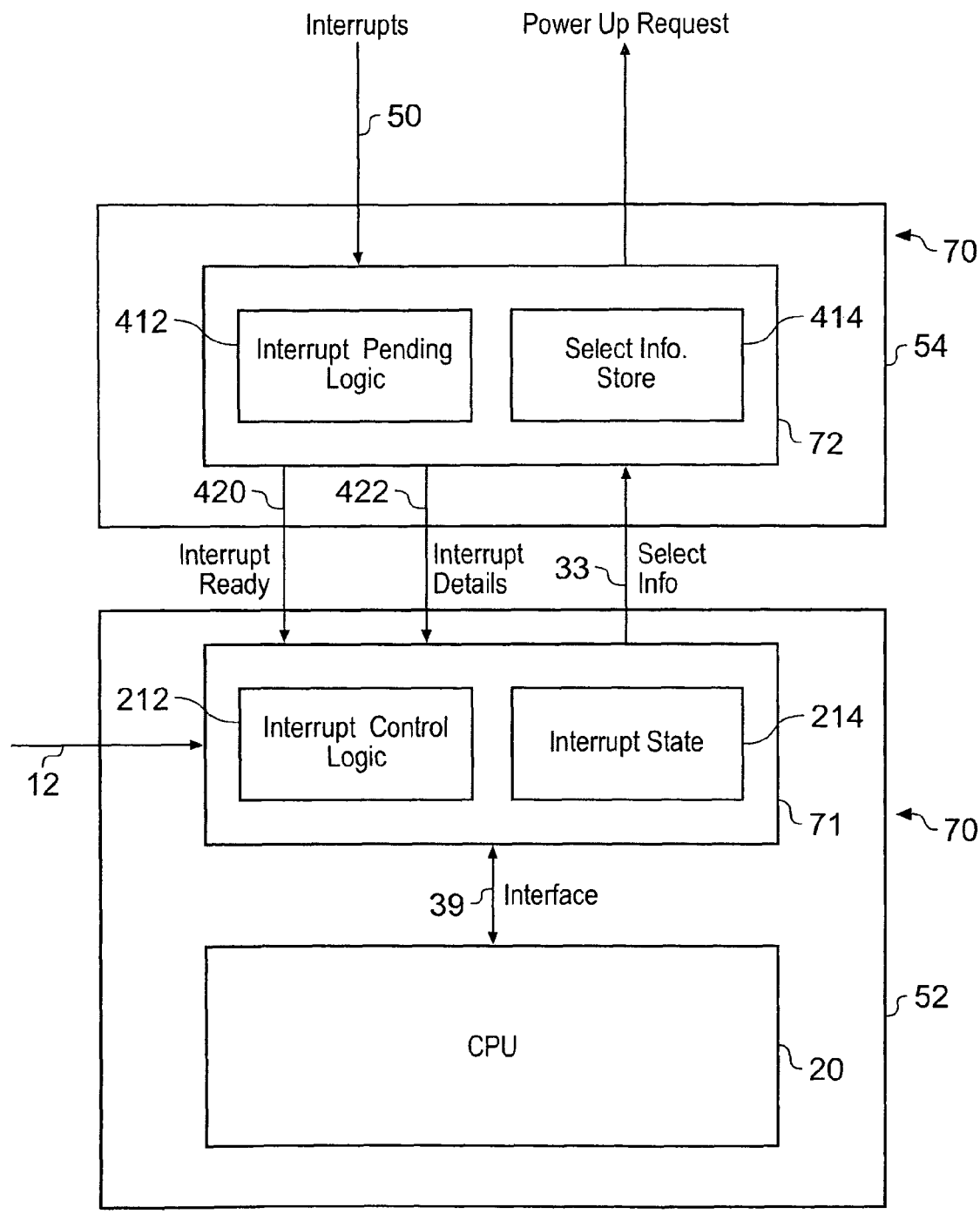
FIG. 5 shows the interrupt controller of FIG. 4 in more detail.

In FIG. 5, a more detailed implementation of the distribution of the interrupt controller 70 across the constantly powered domain 54 and the power control domain 52 is schematically illustrated. As with FIG. 1, the power controlled domain 52 comprises a central processing unit 20 and the interrupt control circuitry 72 of the interrupt controller 70. An interrupt request interface 39 is provided between the central processing unit 20 and interrupt control circuitry 72 to enable the interrupt controller 70 to communicate interrupt requests to the central processing unit 20, and to enable the central processing unit to communicate control data to the interrupt controller 70. The interrupt control circuitry 72 comprises interrupt control logic 212 and an interrupt state store 214. The interrupt state store 214 stores the current interrupt state of the interrupt controller 70. In particular, the interrupt state store 214 holds information indicating which interrupt requests are currently pending at the interrupt controller 70, and any priority information associated with such requests. The interrupt control logic 212 is configured to determine, from the stored interrupt state information in the interrupt state store 214 and the current operating state of the central processing unit 20, which, if any, of the currently pending interrupt requests should be passed to the central processing unit 20 for servicing. The interrupt control logic 212 is also responsive to a low power request signal received on the low power request line 12, to determine, in dependence on the current interrupt state, which interrupt requests should cause the power control domain to exit from the low power mode. The selected interrupt requests are then communicated to the interrupt request monitoring circuitry of the interrupt controller 70 via a select information signal line.

The interrupt request monitoring circuitry, which is provided within the constantly powered domain, comprises interrupt pending logic 412 and a select information store 414. The select information store 414 serves to store the select information communicated from the interrupt control circuitry 71 via the select information signal line 33. The interrupt pending logic 412 serves to monitor interrupts received from interrupt sources over the interrupt request signal lines 50, and to apply a power up request signal on the power up request signal line in the event that one of the received interrupts is identified as indicating exit from low power mode in the select information stored in the select information store 414. When the power up request signal has been asserted on the power up request signal line and when the power controlled domain 52 has been powered up to exit the low power mode, the interrupt request monitoring circuitry 72 communicates an interrupt ready signal to the interrupt control circuitry 71 on an interrupt ready signal line 420, and communicates interrupt details indicative of which interrupt request has been received to the interrupt control circuitry 71 on an interrupt detail signal line 422. The provision of the interrupt ready signal line 420 and the interrupt detail signal line 422 is particularly important for dealing with pulse interrupts, which may have expired at the interrupt request signal lines 50 by the time that the power controlled domain, and thus the interrupt control circuitry 71, have been powered up. In the case of level interrupts, the interrupt ready signal line 420 and the interrupt detail signal line 422 are optional, because the interrupt control circuitry can determine the received interrupts by looking at the signals provided on the interrupt request signal lines 50 directly.

Figure 6:
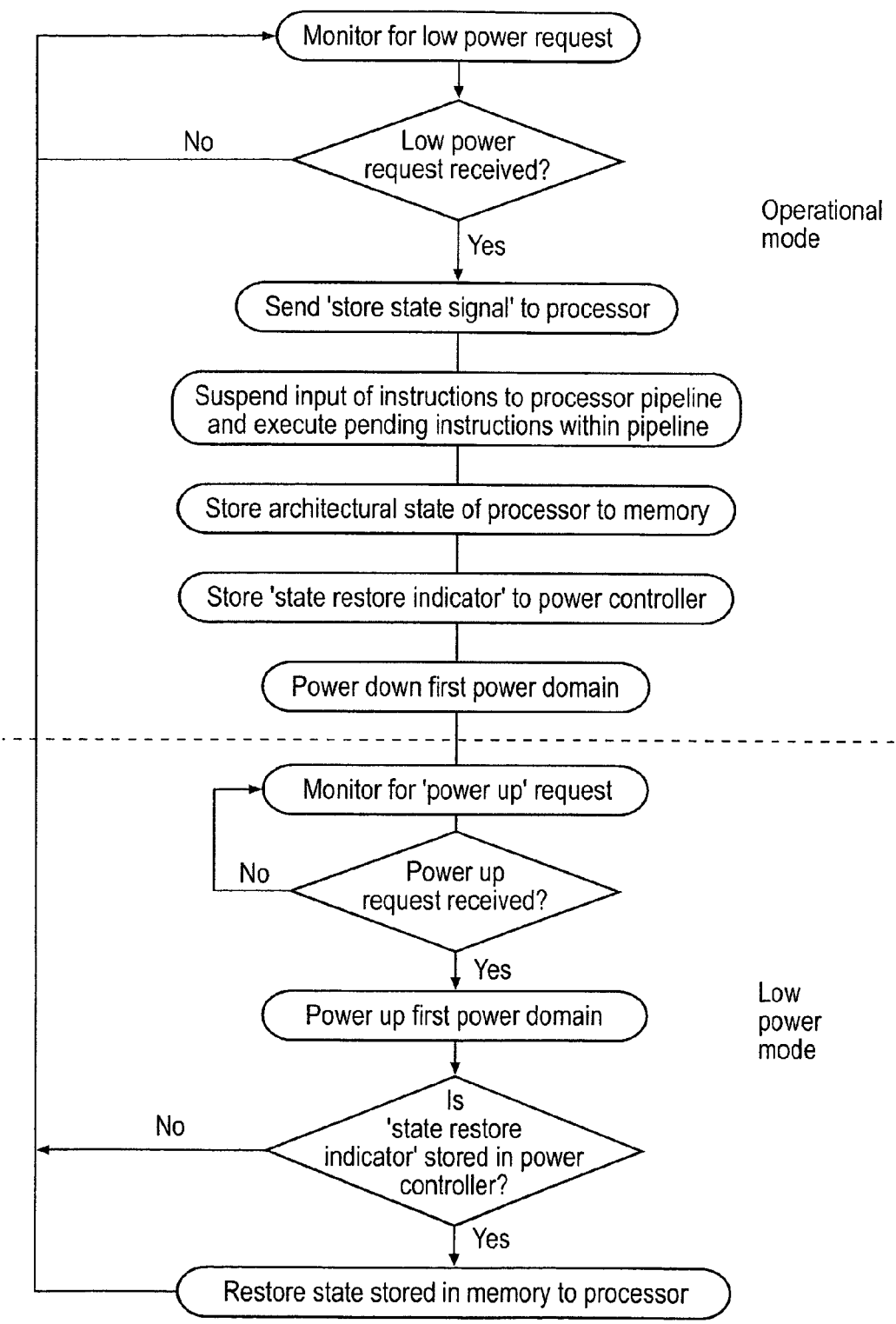
FIG. 6 shows a flow diagram illustrating a method according to an embodiment of the present invention.

FIG. 6 is a flow diagram showing a method for entering low power mode from operational mode and for returning to operational mode from low power mode. Initially the data processing apparatus monitors for low power requests. In response to receiving a low power request a store state signal is sent to the processor. In response to this signal the processor acts to suspend the input of instructions to the processor pipeline and it then executes all pending instructions within the pipeline. By doing this it decreases the amount of state data that needs to be stored. When it has completed this step the architectural state of the processor which is now less than it would have been had this step not been performed is sent to the memory. A state restore indicator is then stored in the power controller and the first power domain is powered down. The processing apparatus is then in low power mode. During this mode the power controller monitors for power up requests. When it receives a power up request it powers up the first power domain. This includes the processor. When it has done this the power controller then checks to see if the state restore indicator is stored in the power controller. If it is it sends a "restore state stored in memory" request to the processor and the state stored in the memory is unloaded back to the processor whereupon the processor can resume normal operational mode. If there is no restore state indicator stored in the power control then this is a normal reset and no state needs to be downloaded from the memory.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
   (i) a processor for processing data, said processor comprising memory interface logic for controlling transfer of data to a memory, said processor being powered in a first power domain;
   (ii) a memory for storing data processed by said processor said memory being powered in a second power domain;
   (iii) a system bus coupled to said processor and said memory and operable to transfer data between said processor and said memory in response to memory transfer requests issued upon said system bus by said memory interface logic during normal processing operation of said processor and said memory; wherein
   (iv) said processor is responsive to a low power request indicating said data processing apparatus should enter a low power mode to:
   (v) control transfer of state data indicating a current state of said processor to said memory via said system bus using said memory interface logic, said state data being sufficient data to restore said processor to an equivalent program state following exit from said low power mode;
   (vi) store said state data in said memory; and
   (vii) power down said first power domain, wherein said processor is configured to store said state data on a stack within said memory in response to said low power request, said processor comprising stack/unstack logic for stacking said state data to said stack in response to said low power request and for unstacking said state from said stack in response to a subsequent power up signal.

2. A data processing apparatus according to claim 1, said data processing apparatus further comprising a controller for controlling powering up and down of said first power domain;
   (i) said controller being powered by said second power domain and comprising a data store for storing a state restore indicator; wherein
   (ii) in response to detection of said low power request said controller stores a state restore indicator value indicating that said processor is powered down in response to said low power request;
   (iii) said controller is responsive to an input signal indicating said processor should power up to power said first power domain up and to send a signal to said processor indicating if said power up is a standard reset or a state restore reset in dependence upon said state restore indicator value; and
   (iv) in response to said controller indicating said power up is in response to said state restore reset said processor loads said stored state data from said memory.

3. A data processing apparatus according to claim 1, said data processing apparatus further comprising a controller for controlling powering up and down of said first power domain;
   (i) said controller being powered by said second power domain and comprising a data store for storing a state restore indicator; wherein
   (ii) in response to detection of said low power request said controller stores a state restore indicator value indicating that said processor is powered down in response to said low power request;
   (iii) said controller is responsive to an input signal indicating said processor should power up to power said first power domain up and to send a signal to said processor indicating if said power up is a standard reset or a state restore reset in dependence upon said state restore indicator value; and
   (iv) in response to said controller indicating said power up is in response to said state restore reset said processor loads said stored state data from said memory;
   wherein said state restore indicator value comprises an address of a top of said stack.

4. A data processing apparatus according to claim 1, said data processing apparatus further comprising an interrupt controller, said processor being configured to store some state data of said processor onto at least a portion of said stack in said memory in response to receipt of an interrupt and to restore said some state in response to said interrupt completing.

5. A data processing apparatus according to claim 4, wherein said low power request comprises a wait for interrupt signal instruction issued by said processor.

6. A data processing apparatus according to claim 4, wherein said interrupt controller comprises a plurality of interrupt inputs for receiving a plurality of interrupts, at least one of said plurality of interrupt inputs comprising a power up signal.

7. A data processing apparatus according to claim 6, wherein said interrupt controller comprises:
   (i) interrupt control circuitry powered in said first power domain; and
   (ii) interrupt request monitoring circuitry powered in said second power domain;
   (iii) said interrupt request monitoring circuitry being adapted to monitor for said power up signal during operation in said low power mode.

8. A data processing apparatus according to claim 7, wherein said interrupt control circuitry comprises interrupt inputs for receiving said interrupt requests and is configured selectively to provide a received interrupt request to said processor;
   (i) said interrupt control circuitry is arranged to communicate interrupt select information to said interrupt request monitoring circuitry, said interrupt select information identifying interrupt requests which indicate exit from said low power mode as said power up signal;

(ii) said interrupt request monitoring circuitry comprises a select information store configured to store said select information communicated to said interrupt request monitoring circuitry by said interrupt control circuitry; and (iii) said interrupt request monitoring circuitry comprises interrupt inputs for receiving said interrupt requests, and is responsive to a received interrupt request identified by said stored interrupt select information as said power up signal to trigger power up of said first power domain.

9. A data processing apparatus according to claim 1, wherein said processor comprises a pipeline processor, and in response to said low power request said data processing apparatus is configured to suspend loading of any further instructions into said pipeline processor and to complete processing of pending instructions within said pipeline processor prior to storing said state data to said memory and powering down said first power domain.

10. A data processing apparatus according to claim 1, wherein said data processing apparatus is configured to select state data to store to said memory in dependence upon current operating conditions of said data processing apparatus.

11. A data processing apparatus according to claim 1, wherein said state data comprises architectural state data sufficient to enable said processor to restart processing data following exit from said low power mode.

12. A data processing apparatus according to claim 11, wherein said processor comprises a plurality of registers, said state data comprising a program counter, a stack pointer and data stored in a subset of said plurality of registers.

13. A data processing apparatus comprising:
(i) a processor for processing data, said processor comprising memory interface logic for controlling transfer of data to a memory, said processor being powered in a first power domain;
(ii) a memory for storing data processed by said processor said memory being powered in a second power domain;
(iii) a system bus coupled to said processor and said memory and operable to transfer data between processor and said memory in response to memory transfer requests issued upon said system bus by said memory interface logic during normal processing operation of said processor and said memory; wherein
(iv) said processor is responsive to a low power request indicating said data processing apparatus should enter a low power mode to:
(v) control transfer of state data indicating a current state of said processor to said memory via said system bus using said memory interface logic, said state data being sufficient data to restore said processor to an equivalent program state following exit from said low power mode;
(vi) store said state data in said memory; and
(vii) power down said first power domain, wherein said data processing apparatus is configured to select state data to store to said memory in dependence upon current operating conditions of said data processing apparatus, wherein said data processing apparatus further comprises a memory protection unit and data processing apparatus is responsive to:
(i) said memory protection unit being operational, to store said memory protection data as part of said state data to said memory; and to
(ii) said memory protection unit being switched off, to not store memory protection data as part of said state data to said memory.

14. A method of saving state prior to entering a low power mode within an apparatus for data processing, said apparatus for processing data having a processor for processing data, said processor comprising memory interface logic for controlling transfer of data to a memory, said processor being powered in a first power domain, a memory for storing data processed by said processor said memory being powered in a second power domain, a system bus coupled to said processor and said memory and operable to transfer data between said processor and said memory in response to memory transfer requests issued upon said system bus by said memory interface logic during normal processing operation of said processor and said memory, said method comprising the steps of:
indicating, in response to a low power request, said data processing apparatus should enter a low power mode:
transferring state data indicating a current state of said processor within said data processing apparatus to said memory via said system bus using said memory interface logic;
storing said state data in said memory; and
powering down said first power domain, wherein said step of storing said state data to said memory comprises storing said state data on a stack within said memory.

15. A method according to claim 14, said method comprising the further steps of:
storing, in response to said low power request, a state restore indicator value indicating that said processor is powered down in response to said low power request;
detecting, while said processor is powered down, a power up request at said controller;
powering up said first power domain, in response to said power up request, and sending a signal to said processor indicating said power up is a state restore reset rather than a standard reset; and
loading, in response to said signal indicating said power up is in response to said state restore reset, said stored state data from said memory to said processor.

16. A method according to claim 15 wherein said step of storing said state data to said memory comprises storing said state data on a stack within said memory; and
wherein said state restore indicator value comprises an address of a top of said stack.

17. A method according to claim 14, wherein said method comprising the further steps of:
storing, in response to an interrupt, some state data of said processor onto at least a portion of said stack in said memory; and
restoring said some state data in response to said interrupt completing.

* * * * *